May 2, 1944.  I. HAMILTON  2,347,947
DOLLY
Filed Oct. 8, 1942

INVENTOR
Irvin Hamilton
BY
Charles H. Brown
ATTORNEY

Patented May 2, 1944

2,347,947

UNITED STATES PATENT OFFICE 2,347,947

DOLLY

Irvin Hamilton, Ridgewood, N. Y.

Application October 8, 1942, Serial No. 461,263

4 Claims. (Cl. 280—61)

The present invention concerns an improved dolly or conveying roller truck for moving heavy or large objects.

The primary object of the present invention is to provide an improved dolly which is compact, of simple mechanical construction, and which possesses a flexibility of movement and an ability to turn easily within its own length not available in known forms of dollys. By means of the dolly of the present invention, a single operator is able to maneuver a heavy load and turn it single handed around corners on a radius equal to one-half the length of the dolly.

A detailed description of the invention follows in conjunction with a drawing, wherein.

Figure 1:
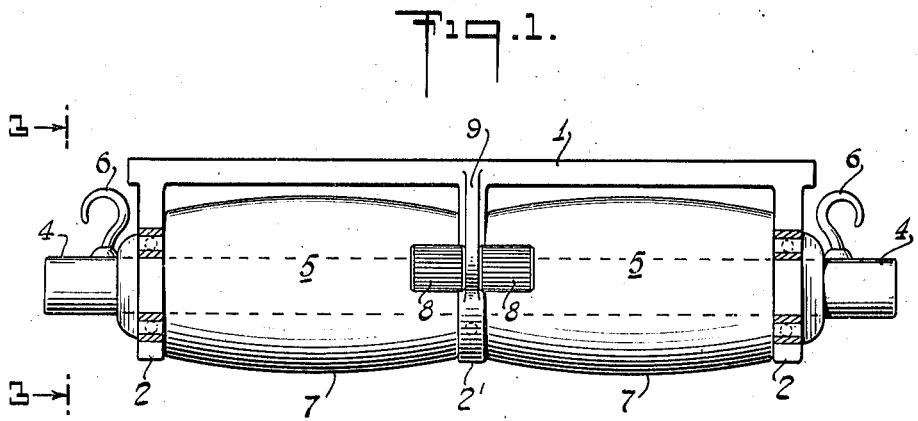
Fig. 1 illustrates a side elevation of the improved dolly.
Figure 2:
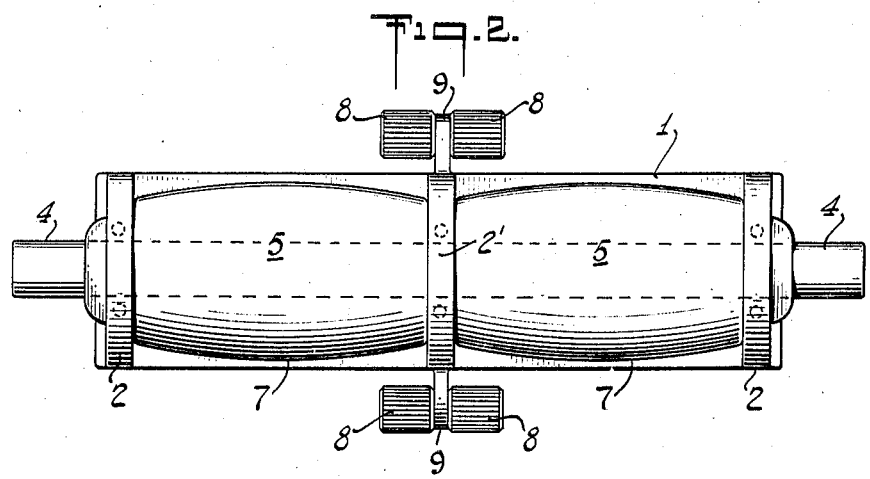
Fig. 2 is a bottom or inverted view of the dolly.

Referring to the drawing in more detail, wherein the same parts are represented by the same reference numerals throughout the figures, the dolly is shown as having a solid, metallic platform or bed 1 for supporting the object to be transported or conveyed. The platform 1 is mounted on two end supporting metallic brackets or plates 2, 2 and a centrally located bracket or plate 2'. These three brackets or plates are secured to the platform 1 in any suitable manner, as by welding, and form bearings for a shaft 4 which passes through all three plates 2, 2', 2. Shaft 4 accommodates two hollow or tubular rollers 5, 5 which cooperate at both ends with ball bearings shown in dotted lines to permit free rolling over the shaft. Rollers 5, 5 are rigidly spaced to prevent side shifting of the platform 1 relative to the rollers in the operation of the dolly. The shaft 4 is provided with hooks 6 at both ends to enable a rope or chain slinger to fasten the load rigidly onto the platform.

An important feature of the dolly of the invention lies not only in the end to end arrangement of the rollers but in their configuration which includes a crown at their center portions. This crown need be only very small to achieve the improved results obtained by the invention. As an example, the middle portion of the roller may be only $\frac{1}{32}''$ larger, more or less, than the ends of the roller. This increase in diameter of both rollers at the middle relative to ends of the rollers provides two pivot points which permit easy turning of the dolly and load which it supports. In this way a single operator can transport an extremely heavy load and still be able to turn the dolly and load within one-half the length of the dolly.

Another feature of the invention lies in the use of two pairs of anti-teetering or anti-tilting rollers 8, 8 located on opposite sides of the platform 1 and supported from central bracket or plate 2'. Each pair of auxiliary rollers, sometimes called outboard rollers, is mounted on a shaft 10 which passes through an ear-like bracket 9 which is welded or molded onto the central plate 2'. The auxiliary anti-tilting rollers 8, 8 prevent the dolly from turning over when loaded with loads that are long and high.

Figure 3:
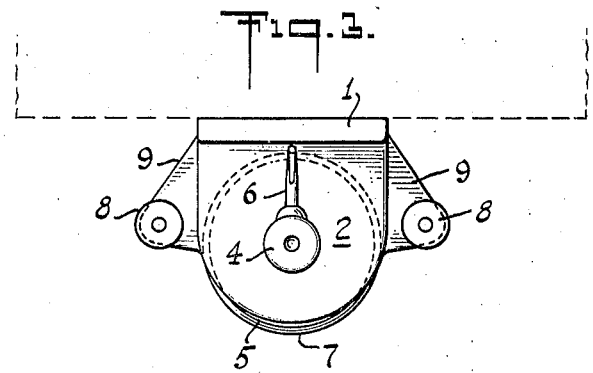
Fig. 3 is an end view of the dolly along the line 3—3 of Fig. 1.

The dotted lines of Fig. 3 show the outlines of a load mounted on the platform 1. The diameter of the rollers 5, 5 will, of course, be dependent upon the load to be supported.

The dolly of the invention has been tried out with remarkable success in an airplane factory for carrying all sorts of long and heavy loads. Its flexibility of movement in small spaces has enabled movement of manufacturing parts with an ease and simplicity lacking in other roller trucks. In fact, the dolly requires no additional clearance space or turning convenience beyond are area of the base of the load.

What is claimed is:

1. A conveying truck comprising a flat platform supported by three, spaced, parallel plates arranged perpendicularly to the plane of the platform, one of said plates being in the center of said platform and the other two plates being near the ends of said platform, a common shaft passing through all three of said plates, a pair of equal size rollers arranged end to end in closely adjacent manner and mounted on bearings on said shaft, said rollers being located on opposite sides of said central plate, each of said rollers being larger in the middle than at the ends, the length of said flat platform being not substantially greater than the lengths of said rollers arranged end to end, the width of said flat platform being not substantially greater than the width of one of said rollers, and an anti-tilting roller extending beyond said platform and of appreciably smaller size than said first rollers, the longitudinal axis of said anti-tilting roller being parallel to the longitudinal axis of said first rollers but located closer to said platform, as a result of which movement of said anti-tilting roller is in the same direction as the movement of said pair of rollers when said platform is tilted toward said anti-tilting roller.

2. A conveying truck comprising a flat platform supported by three, spaced, parallel plates arranged perpendicularly to the plane of the platform, one of said plates being in the center of said platform and the other two plates being near the ends of said platform, a common shaft passing through all three of said plates, a pair of equal size rollers arranged end to end in closely adjacent manner and mounted on bearings on said shaft, said rollers being located on opposite sides of said central plate, each of said rollers being larger in the middle than at the ends, brackets mounted on said center plate and in the same plane thereof but on opposite sides of said platform, and a pair of anti-tilting rollers of relatively small size supported by each bracket, the anti-tilting rollers of each of said last pair being arranged end to end on opposite sides of its supporting bracket.

3. A conveying truck comprising a flat platform supported by three, spaced, parallel plates arranged perpendicularly to the plane of the platform, one of said plates being in the center of said platform and the other two plates being near the ends of said platform, a common shaft passing through all three of said plates, a pair of equal size rollers arranged end to end in closely adjacent manner and mounted on bearings on said shaft, said rollers being located on opposite sides of said central plate, each of said rollers being larger in the middle than at the ends, brackets fastened to opposite sides of said platform and to said center plate, and at least one anti-tilting roller of relatively small size supported by each bracket below said platform.

4. A conveying truck comprising a flat continuously solid metallic platform supported by three, spaced, parallel metal plates arranged perpendicularly to the plane of the platform and secured thereto, one of said plates being in the center of said platform and the other two plates being near the ends of said platform, a common shaft passing through all three of said plates, a pair of equal size rollers arranged end to end in closely adjacent manner and mounted on bearings on said shaft, said rollers being located on opposite sides of said central plate, each of said rollers being larger in the middle than at the ends, metal brackets secured to opposite sides of said platform and to said center plate, and at least one anti-tilting roller of smaller size than the other rollers supported by each bracket below said platform.

IRVIN HAMILTON.